Figure 1:
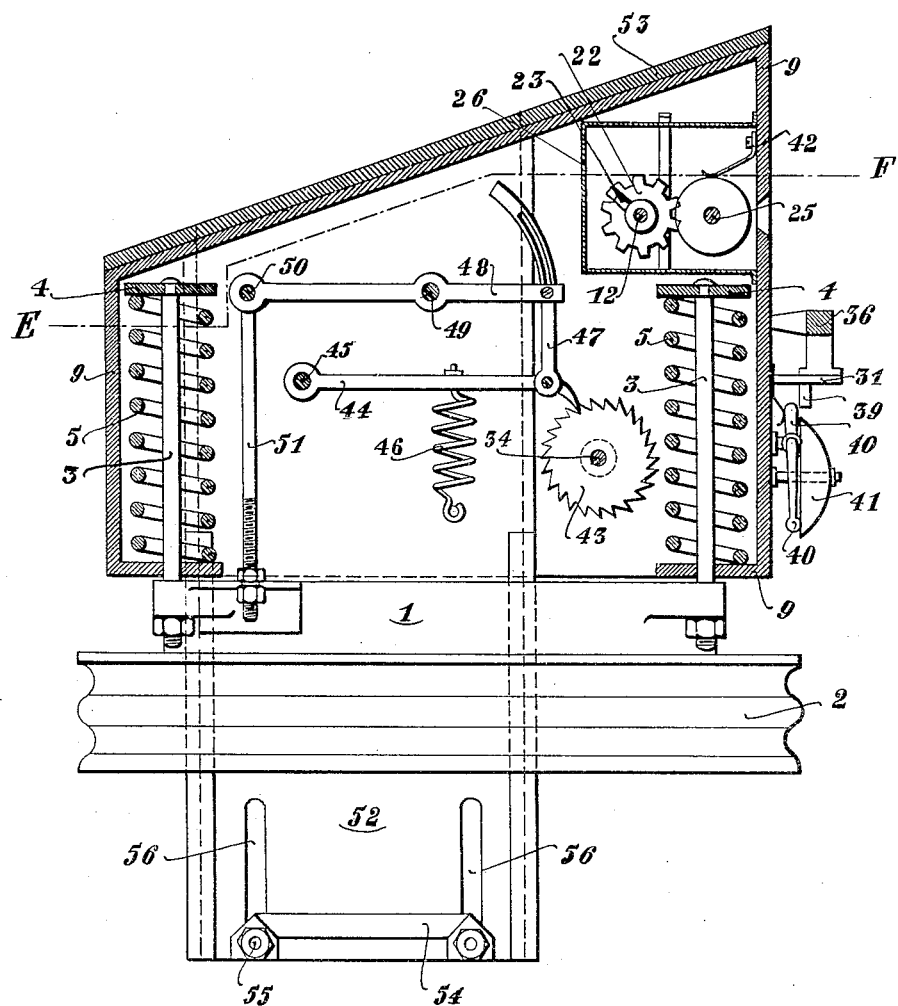

C. DROZ.
APPARATUS FOR AUTOMATICALLY FILLING, WEIGHING, AND REGISTERING SACKS.
APPLICATION FILED SEPT. 16, 1908.

932,688. Patented Aug. 31, 1909.
4 SHEETS—SHEET 1.

C. DROZ.
APPARATUS FOR AUTOMATICALLY FILLING, WEIGHING, AND REGISTERING SACKS.
APPLICATION FILED SEPT. 16, 1908.

932,688.

Patented Aug. 31, 1909.
4 SHEETS—SHEET 4.

UNITED STATES PATENT OFFICE.

CAMILLE DROZ, OF BASEL, SWITZERLAND.

APPARATUS FOR AUTOMATICALLY FILLING, WEIGHING, AND REGISTERING SACKS.

932,688.   Specification of Letters Patent.   Patented Aug. 31, 1909.

Application filed September 16, 1908. Serial No. 453,357.

*To all whom it may concern:*

Be it known that I, CAMILLE DROZ, a citizen of the Swiss Confederation, and resident of Basel, Switzerland, have invented new and useful Improvements in Apparatus for Automatically Filling, Weighing, and Registering Sacks, of which the following is a specification.

The present invention relates to an apparatus for automatically filling sacks, combined with a device for simultaneously weighing the sacks and for registering the number of filled sacks.

The nature of the invention consists in that besides weighing the material which has been filled into the sacks, the number of filled sacks is indicated, so that it can be ascertained at any time how many sacks have been filled with a predetermined weight.

In the drawings the invention is represented by way of example.

Figure 2:
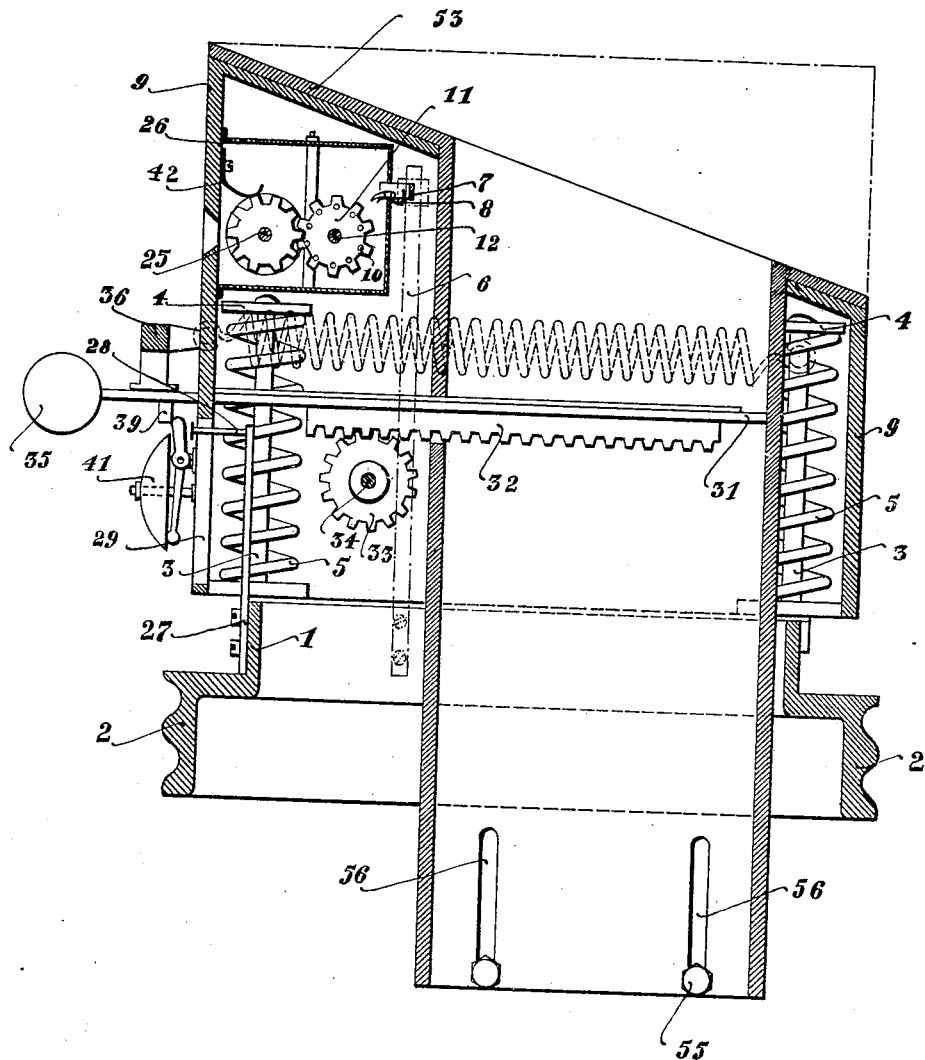
Figure 3:
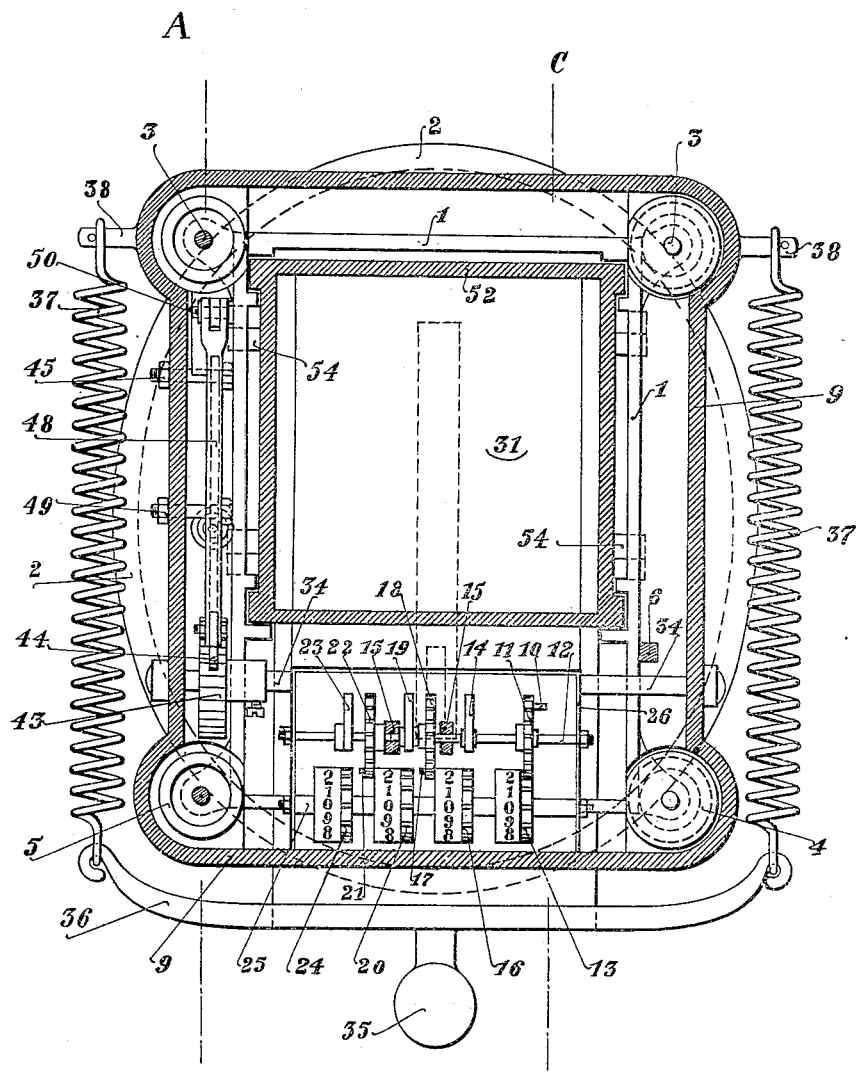
Figure 4:
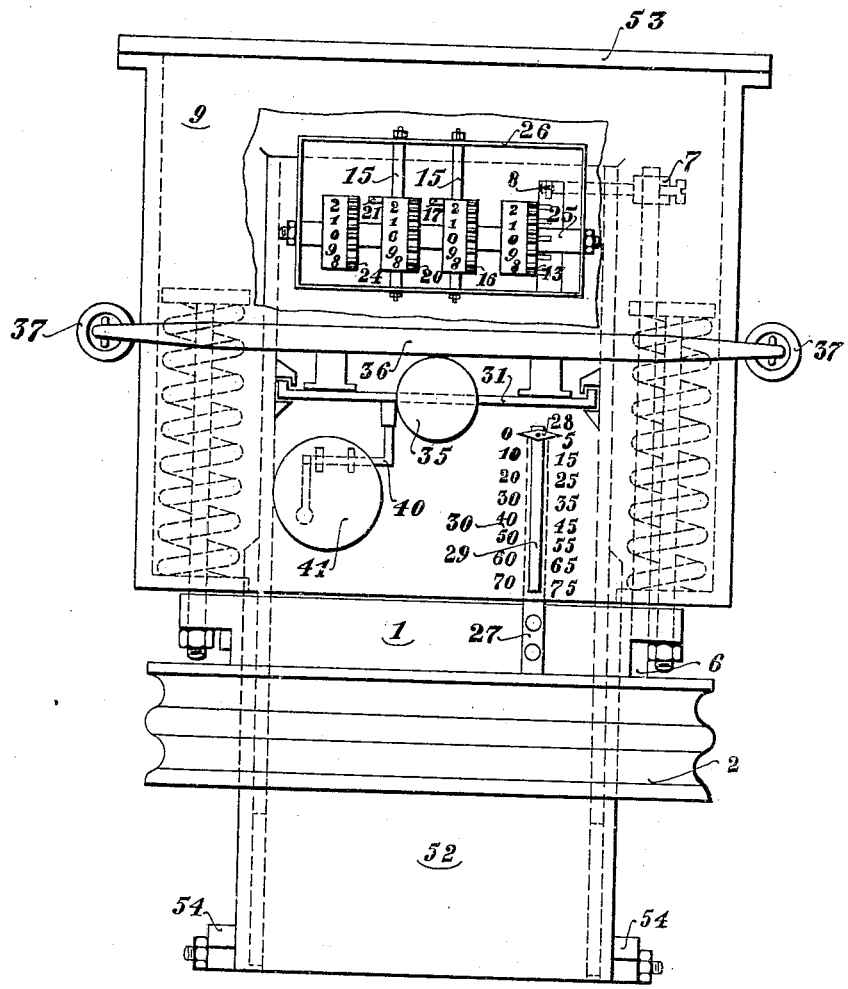

Figure 1 is a sectional side elevation on line A—B of Fig. 3; Fig. 2 is a similar elevation on line C—D of Fig. 3; Fig. 3 is a sectional plan on line E—F of Fig. 1; Fig. 4 is a front view.

The sacks to be filled are fastened to the collar 2 of the square frame 1, said collar having preferably an oval shape. Extending from frame 1 into the casing 9 are four screw bolts 3, which engage with lugs provided on said casing. The upper ends of bolts 3 have disks 4 and they are surrounded by spiral springs 5, located between the lugs of the casing and the disks 4, so that the frame is suspended on the same. The strength of springs 5 depends on the extreme weight for which the apparatus is constructed. A rod 6, extending from frame 1 terminates in the upper part of casing 9 and has an arm 7 attached to its upper end, which carries a spring-influenced pawl 8. This pawl 8 is adapted to engage with pins 10 (Fig. 2) of a toothed wheel 11, when the frame 1 and with it the rod 6 be pulled down, whereby the toothed wheel 11 is turned through a distance equal to the pitch of the teeth. The toothed wheel 11 which is in mesh with the figure disk 13, is keyed on a shaft 12, composed of three parts and mounted in the casing 26 and in brackets 15. An arm 14 is turned simultaneously with the toothed wheel 11, said arm being rigidly keyed on shaft 12 and fitting in the teeth of the rim provided on the figure disk 16, hence turning the latter through a distance equal to the pitch between two teeth. The figure disk 16 has a pin 17 which engages with the toothed wheel 18 and turns the same corresponding to the movements of said disk 16. An arm 19 is moved simultaneously with the wheel 18 and revolves the figure disk 20 through a distance equal to the pitch of the teeth. A pin 21 of figure disk 20 operates the wheel 22, while the arm 23 rotates the figure disk 24 through a distance equal to the pitch of the teeth. The toothed wheels 11, 18 and 22, and the rims of the figure disks 13, 16, 20 and 24 are each furnished with ten teeth and arranged at the ratio of 1 to 10, so that, when the figure disk for the units has revolved through ten teeth the next following disk is revolved for one tooth and so on in the well known manner.

The figure disks are loosely mounted upon shaft 25 and governed by a spring 42. A bar 27 is screwed or otherwise secured to frame 1 and projects through a slot 29; a hand 28 is fixed to the end of said bar. The hand indicates the weight carried by frame 1 on the scales 30 which are marked on the outer surface of casing 9. The square funnel 52 is fixed by means of screw bolts to the casing 9 said screw bolts passing through the flange 53 of the funnel. The slide 31 (Fig. 3) of funnel 52 is guided in the wall of the casing 9 and in the funnel by means of guide grooves and provided with a handle 35 projecting from the casing. A bow 36 which is fixed to the slide has strong spiral springs 37 attached to its ends, which are further attached to arms 38 of casing 9 so that they are tensioned when the slide is withdrawn. On an axle 34 which is revolubly mounted in casing 9 a toothed wheel 33 and a ratchet wheel 43 are keyed, which engage with a rack 32 fixed to the slide 31 and with a pawl 44 respectively which is pivoted at 45 and influence by spiral spring 46. A two armed lever 48, pivoted at 49, is guided with one end in a slotted bar 47 which is linked to pawl 44, its other end being connected by means of link-pin 50 with a rod 51, the lower end of which is adjustably fixed in frame 1. An arm 39 of slide 31 is adapted to abut against the hammer 40 of bell 41 when the slide is in closed position so that the bell is struck each time when the slide is pushed home. Two stops 54 (Figs. 1 and 4) are fixed in the lower end of funnel 52 by means of screw bolts 55, adapted to slide in longitudinal slots 56 of funnel 52. The lid of casing 9 and the flange 53 of funnel 52 can be horizontal to fit upon the joint of the working machine.

The operation is as follows:—The material which comes from the grinding or crushing machine is conducted through funnel 52 into the sack which has previously been suspended to collar 2 of frame 1. The slide 31 has been withdrawn whereby the springs 37 have been tensioned. The slide is secured in the open position by pawl 44 engaging with ratchet wheel 43. Frame 1 descends gradually with the filling sack whereby springs 5 are continuously tensioned or compressed. The levers and rods 6, 27 and 51 descend with frame 1 and hand 28 of lever 27 indicates on scale 30 the weight of the sack. The arm 7 which is adjustably connected with rod 6 has been regulated so that as soon as hand 28 indicates the proper graduation, the first figure-disk 13 is revolved for one tooth by means of the spring influenced pawl 8. The movements of figure disk 13 are transferred to figure-disk 16 and so on, so that the number of the filled sacks can be controlled at any moment.

During the filling of the sack the two armed lever 48 is actuated by means of rod 51 fixed to the frame which descends with the sack so that when the hand 28 arrives at the proper graduation of the scale 30 the end of lever 48 which is guided in slotted bar 47 releases the pawl 44 and withdraws the same from the ratchet wheel 43 whereby axle 34 is released so that the slide 31 is automatically returned to the closed position under the influence of the springs 37 (Fig. 2), the bell 41 being simultaneously struck by its hammer 40 owing to arm 39 of the slide. When the sack be removed from the frame 1 the frame returns to its normal position so that the apparatus can be used again.

I claim:—

1. An apparatus for automatically filling sacks up to a determined weight, for indicating the weight of the sack and for registering the number of sacks filled, comprising in combination a funnel connected with the crushing or grinding machine, a casing mounted on said funnel, a movable frame suspended in the casing and serving for the reception of the sack to be filled, a lever connected with the frame, a graduated scale, a hand linked to said lever and moving over the scale, a pawl connected with the movable frame, a registering device operated by said second lever, a spring influenced slide in the funnel, a device for maintaining said slide in open position and a third lever connected with the movable frame for releasing the device for maintaining the slide in open position, substantially as described and for the purpose set forth.

2. The device for securing a slide in open position comprising in combination the slide, a rack fixed to the slide, a toothed wheel gearing with said rack, the axle of said toothed wheel horizontally mounted in the casing of the apparatus, a ratchet wheel keyed on said axle, a spring influenced pawl engaging with said ratchet wheel, a fork linked to the pawl, a two armed lever hinged to the fork and a draw rod hinged with one end to the two armed lever and fixed with the other end to the movable frame, substantially as described and for the purpose set forth.

CAMILLE DROZ.

Witnesses:
 JEAN TECHNER-HATT,
 ARNOLD T. ZUBER.